United States Patent [19]

Tsunoda

[11] 4,314,232
[45] Feb. 2, 1982

[54] VOICE WARNING SYSTEM FOR AN AUTOMOTIVE VEHICLE

[75] Inventor: Masakazu Tsunoda, Fujisawa, Japan

[73] Assignee: Nissan Motor Company, Limited, Kanagawa, Japan

[21] Appl. No.: 199,710

[22] Filed: Oct. 23, 1980

[30] Foreign Application Priority Data

Oct. 24, 1979 [JP] Japan .................. 54-136430

[51] Int. Cl.³ .......................... G08B 3/10
[52] U.S. Cl. ................. 340/52 F; 340/27 R
[58] Field of Search ............. 340/27 R, 52 R, 52 F, 340/539; 307/9, 10 R

[56] References Cited

U.S. PATENT DOCUMENTS

3,581,014  5/1971  Vogel ................. 340/27 R

*Primary Examiner*—Alvin H. Waring
*Attorney, Agent, or Firm*—Lowe, King, Price & Becker

[57] ABSTRACT

A voice warning system for an automotive vehicle wherein an automatic vehicle speed control device is incorporated, whereby various items of information such as listed below are conveyed to the vehicle driver in voice form at a suitable volume level without confusion with one another and reliably because of a priority order within the items. The items of information to be conveyed to the driver are in the priority order (1) an actual vehicle speed when an accelerate or decelerate switch is turned on and a driver desired speed set when the accelerate or decelerate switch is turned off (2) a vehicle speed warning when the actual speed exceeds preset speed limit and (3) a trip distance the automotive vehicle has traveled.

7 Claims, 9 Drawing Figures

VOICE WARNING SYSTEM FOR AN AUTOMOTIVE VEHICLE

BACKGROUND OF THE INVENTION

(1) Field of the Invention

The present invention relates generally to a voice warning system for an automotive vehicle and more specifically to a voice warning system for an automotive vehicle wherein an automatic speed control device is incorporated and whereby various items of vehicle information necessary for safe driving are conveyed to the driver in a series of messages in voice form and at a suitable volume.

(2) Description of the Prior Art

Recently, in some automotive vehicles has been incorporated an automatic speed control device (hereinafter referred to simply as "ASCD"). In this, an accelerate switch and/or decelerate switch is provided; while the accelerate or decelerate switch is on, the vehicle speed is increased or decreased progressively, but when this switch is turned off, the current vehicle speed is taken as a set speed, and the vehicle speed is maintained automatically at this set speed regardless of operation of an accelerator pedal. The ASCD is often applied when the vehicle is allowed to run at a high speed, e.g., on a highway and is released when, e.g., a brake pedal is depressed. In addition, some automotive vehicles have been provided with a trip distance information device, such a trip meter as a typical example, for conveying information on how far the automotive vehicle has traveled to the driver. Another device which has been provided is a vehicle speed warning device which gives a warning sound, from for example an electronic buzzer, when the vehicle speed exceeds some speed limit predetermined by a speed limit preset lever operated by the driver.

In driving an automotive vehicle provided with all these devices, the driver needs necessary items of information such as information on the automatic speed control, warning information on the preset speed limit, and trip distance information. When such an automotive vehicle is driven, there is a possibility that the information on the automatic speed control such as the current vehicle speed while the vehicle is being accelerated or decelerated by the ASCD and its preset vehicle speed might be mixed up with set speed limit warning information or trip distance information. Consequently, the items of vehicle speed information are confused with each other so that the driver may mishear such items of vehicle speed information.

SUMMARY OF THE INVENTION

With the above problem in mind, it is a primary object of the invention to provide a voice warning system for an automotive vehicle which informs the driver of various items of warning information on vehicle speed in voice form and which can convey various messages to the driver without confusion between them.

To achieve the above object, the voice warning system according to the present invention produces messages with a priority system whereby in the interval from turning on an accelerate or decelerate switch to the completion of information on the speed set thereby, the only other information given is that of current vehicle speed. At other times, a message that the current vehicle speed exceeds preset speed limit is always given higher priority than a message indicating that the vehicle has traveled a predetermined trip distance.

BRIEF DESCRIPTION OF THE DRAWINGS

The features and advantages of the voice warning system according to the present invention will be more clearly appreciated from the following description taken in conjunction with the accompanying drawings in which.

DETAILED DESCRIPTION OF THE PREFERRED EMBODIMENTS

Figure 1:
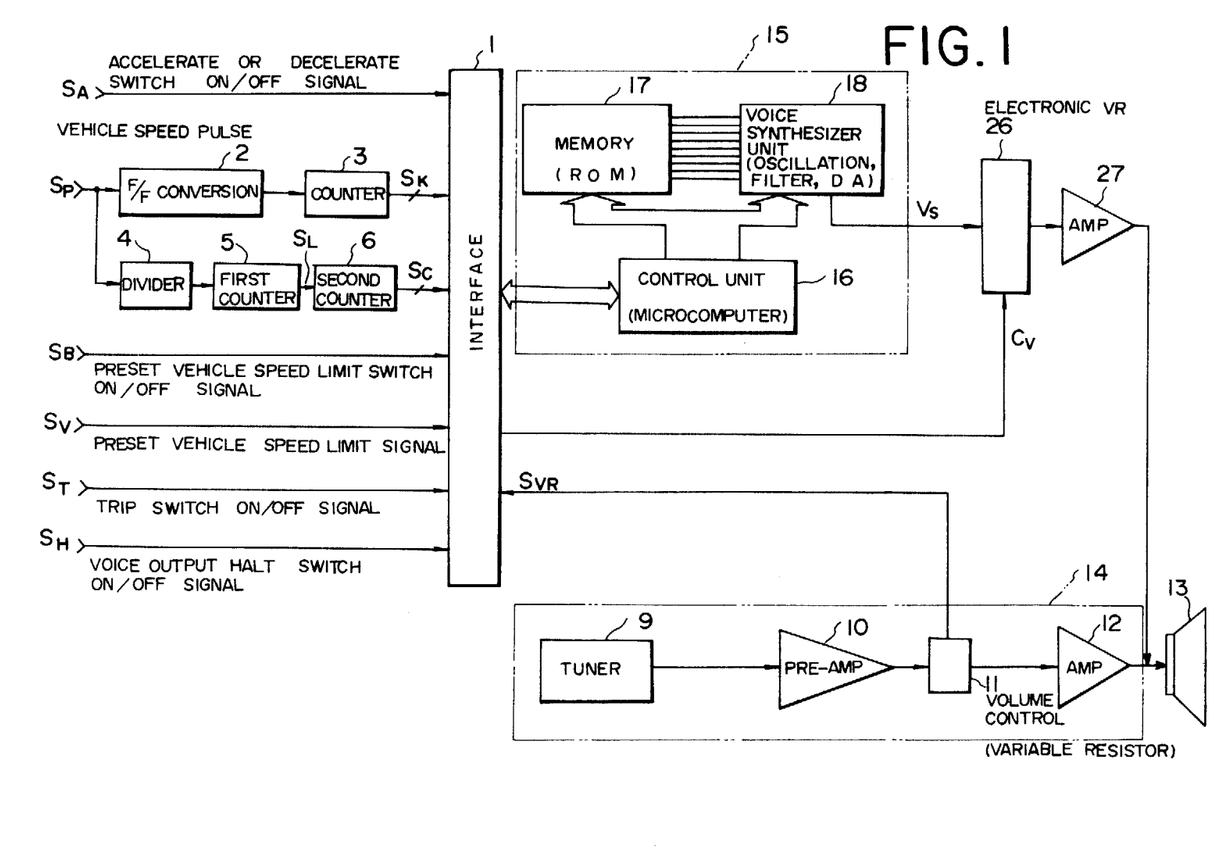
FIG. 1 is a simplified block diagram showing one preferred embodiment of a voice warning system according to the present invention.

Reference is now made to the drawings, and more specifically to FIG. 1, wherein one preferred embodiment of the present invention is illustrated.

In FIG. 1, numeral 1 denotes an input/output interface circuit (hereinafter referred to simply as "interface") comprising, e.g., A/D convertors and multiplexer, etc. At input terminals of the interface 1 the following listed signals are inputted:

(a) On or off signal from ASCD accelerate or decelerate switch: $S_A$;

(b) a vehicle instantaneous speed signal as a digital count value obtained by converting a vehicle speed pulse $S_P$ from a vehicle speed sensor into a pulse signal of high repetition rate through a frequency-to-frequency convertor 2 for making vehicle speed information more accurate and counting the converted vehicle pulse signal of high repetition rate by a counter 3 for a predetermined period of time prescribed by a timer circuit not shown in the drawing: $S_K$; (In this case, the counter 3 is reset each time the predetermined period of time has elapsed.)

(c) on or off signal from speed limit preset switch: $S_B$ (The speed limit preset switch is associated with the off position of a speed limit presetting device 7 shown in FIG. 2. The switch is turned off only when a speed preset lever 8 is located at the OFF position.)

Figures 2, 3:
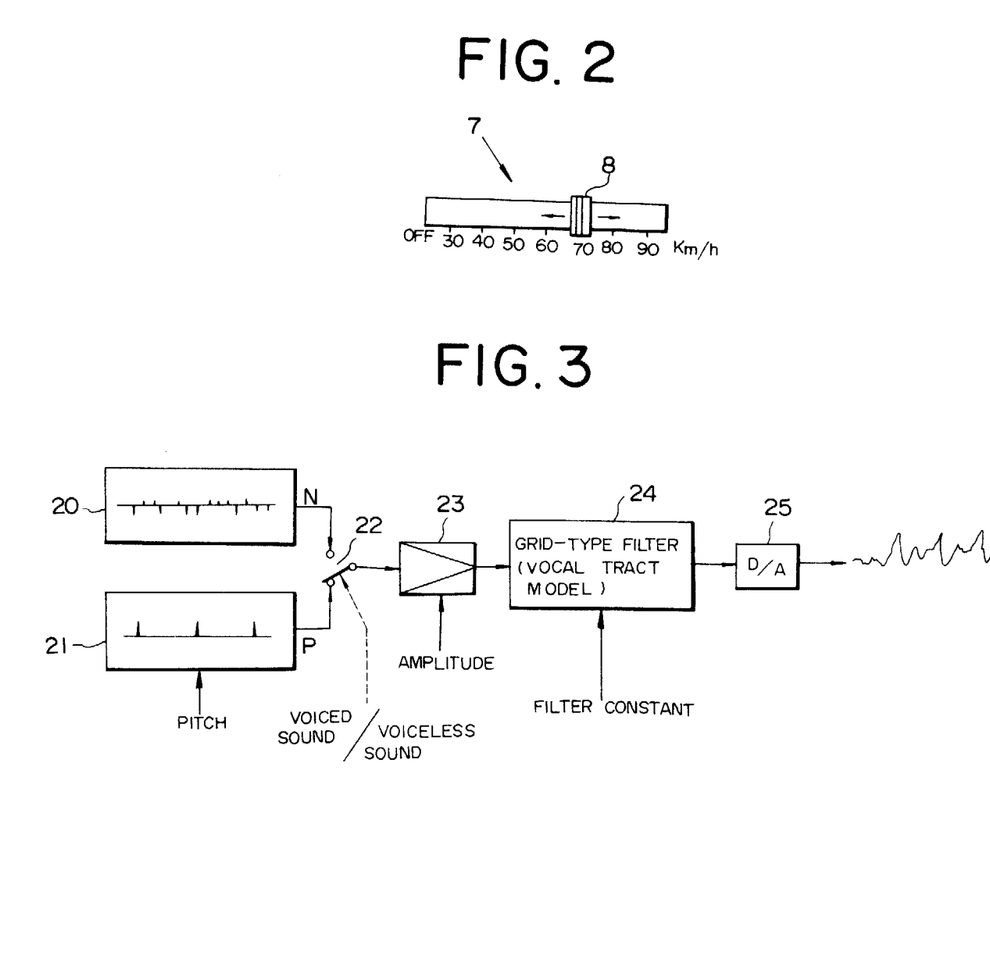
FIG. 2 shows a vehicle speed presetting unit of the preferred embodiment shown in FIG. 1.
FIG. 3 shows a simplified block diagram assisting in explaining the principle of operation on a voice synthesizer using the linear prediction code system.

(d) A preset speed limit signal of analog voltage form in proportion to the speed preset by the speed preset lever 8: $S_V$ (In this case, the preset vehicle speed signal $S_V$ is outputted from a signal generator circuit not shown in the drawing according to the vehicle speed preset when the arbitrary vehicle speed preset lever 8 is slid to the right-hand direction from the OFF position to some speed graduation.)

(e) On or off signal of voice output halt switch: $S_H$ (This halt switch enables the message output for, e.g., trip distance information only to be inhibited.)

(f) A volume control signal indicating the setting of a volume control 11 of a car radio 14: $S_{VR}$ The car radio 14 comprises a tuner 9, preamplifier 10, the volume control 11 (variable resistor), an amplifier 12, and a speaker 13.

(g) A trip distance signal outputted from a second counter 6: $S_C$ The trip distance signal $S_C$ is obtained in such a way that the vehicle speed pulses $S_P$ are divided by a divider 4 and fed into a first counter 5 where an overflow signal $S_L$ is outputted whenever the first counter 5 counts up to a full scale value and is fed into the second counter 6 where the counted signal $S_C$ is outputted when the second counter 6 counts the number of the signal $S_L$. The first and second counters 5 and 6 are initially reset by a signal $S_T$ generated when a trip switch is turned on.

(h) A trip switch on or off signal: $S_T$

Among the signals listed above, the preset vehicle speed signal $S_P$ and volume control signal $S_{VR}$ are converted by analog-to-digital convertors in the interface 1 into corresponding digital signals.

The output signals of the interface 1 are fed into a control unit 16 of a voice warning control device 15 at a given timing. A microcomputer serves as the control unit 16. The voice warning control device 15 comprises three LSI units: the control unit 14, a memory (ROM) 15, and a voice synthesizer unit 16 acting as a voice synthesizing device using Linear Prediction Coding (LPC) system. Such an LPC system is now commercially available, manufactured for example by Texas Instruments Incorporated. FIG. 3 shows schematically the principle of operation of the voice synthesizer.

In this synthesizer, pseudo-random noise signals N generated from the first sound source oscillator (white noise generator) 20 are selected by a switch 22 for voiceless sounds; periodic impulse signals P generated from the second source oscillator (impulse generator) 21 are selected by the switch 22 for voiced sounds. After an amplifier 23 amplifies these signals N and P, they are formed into a voice sound by a grid-type filter 24 where the resonant characteristics of the human vocal tract (vocal organs such as tongue and lips located above the vocal chords) in speaking is modeled, and are outputted as a synthesized voice signal after conversion into an analog signal through a D/A converter 25.

The different values of constants such as the pitch of the periodic impulse signal, the difference between voiced and voiceless sounds, the amplification degree of the amplifier 23, and the filter constants of the grid-type filter 24, are stored in the memory (ROM) 17 of FIG. 1. On the other hand, the voice synthesizer unit 18 comprises various circuits which correspond to a first sound source oscillator 20, a second sound source oscillator 21, a switch 22, an amplifier 23, a grid-type filter 24, and a D/A converter 25 so that the synthesized voice sound signal $V_S$ necessary for warning information can be outputted after being controlled according to the output signal selected by the control unit 16.

The voice sound signal $V_S$ outputted from the voice synthesizer unit 18 of the voice warning control device 15 is controlled by a voltage-controlled electronic volume control 26 and amplified by an amplifier 27 and produced by a speaker 13 of the car radio 14.

The microcomputer as the control unit 16 determines the voice output volume level on a basis of the volume adjustment level of the volume control 11 of the car radio 14 from the volume control signal $S_{VR}$ and outputs a volume adjustment signal $C_V$ via the interface 1 to the electronic volume control 26. Therefore, the volume of the voice output signal can be adjusted to the driver's preference.

In addition, if the microcomputer as the control unit 16, comprising in general a central processing unit (CPU), a random access memory (RAM), a read only memory (ROM), and a clock generator, detects that the voice output halt switch is turned off from the signal $S_H$, it halts outputting the voice synthesized signal $V_S$ from the voice synthesizer unit 18. Alternatively, the volume adjustment signal $C_V$ may be used to turn the electronic volume control 26 toward its zero output direction.

Figure 4:
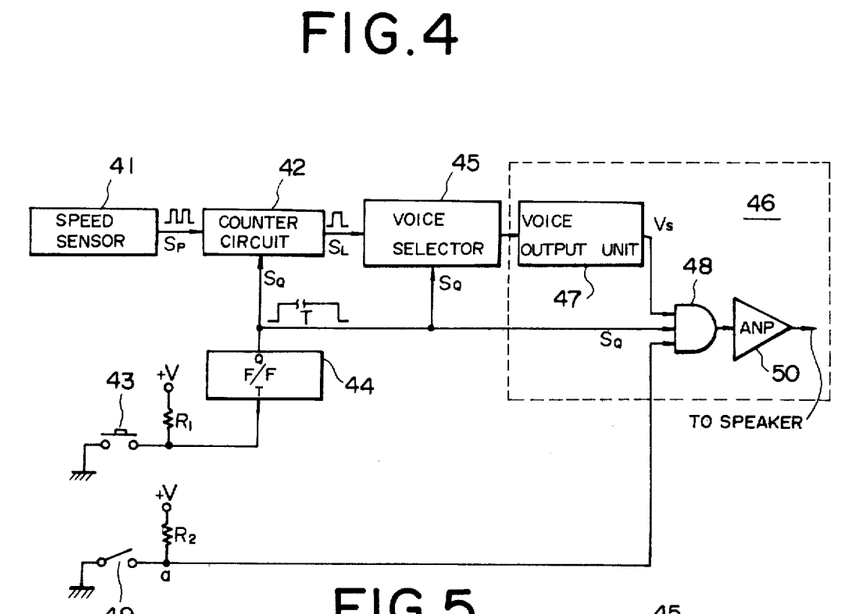
FIG. 4 is a circuit diagram of another example of the voice warning system according to the present invention particularly relating to trip distance information.
Figure 5:
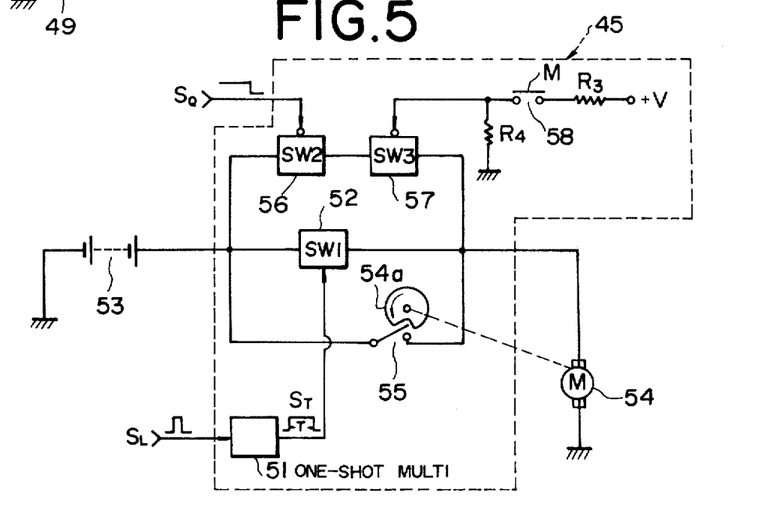
FIG. 5 is a detailed circuit diagram of a voice selector of the other example shown in FIG. 4.

With reference to FIGS. 4 and 5, another example of the voice warning system particularly for conveying an item of information of trip distance the vehicle has traveled in voice form is described. The warning system for conveying trip distance information comprises substantially a trip distance detecting circuit for counting the number of vehicle speed pulses outputted from the vehicle speed sensor starting with the operation of a trip switch and for outputting a signal whenever the counted value equals a predetermined value (corresponding to a predetermined distance interval), a voice selector for selectively outputting the message to be produced according to the output signal from the trip distance detecting circuit, and a voice output controller for outputting trip distance information according to the message selected by the voice selector in voice form.

In FIG. 4, numeral 41 denotes a vehicle speed sensor which outputs vehicle speed pulses $S_P$ whose repetition rate corresponds to the number of rotations an output shaft of the transmission (e.g. 1340 pulses per kilometer). Numeral 42 denotes a counter circuit which serves as detecting a trip distance. The counter circuit 42 has its full count value corresponding to, e.g., 0.5 kilometers of distance (e.g. 670 pulses). When the count value arrives at the full count value, the counter circuit 42 outputs a signal $S_L$, automatically overflows and simultaneously is reset to an initial value. The counter circuit 42 starts operation by means of a trip switch 43 and a toggle flip flop circuit 44. When the trip switch 43 is depressed, an input terminal T of the flip-flop 44 goes low and the output terminal Q is set high by the bias supply $+V$ via a resistor $R_1$. The counter 42 is thereby initially reset on the rising edge of an output signal $S_Q$. Therefore, once the trip switch 43 is depressed, the counter 42 starts counting the number of vehicle speed pulses $S_P$ from the vehicle speed sensor 41. The counter circuit 42 overflows and outputs the signal $S_L$ each time the counter value reaches a value corresponding to a trip distance of 0.5 km. When the trip switch 43 is depressed once again, the Q output of the flip-flop 44 returns from the high level to low. Numeral 45 denotes a voice selector which selects a message such as "Zero point five kilometers," "One kilometer," . . . or "One hundred kilometers." The voice selector 45 may for example control a driving motor in a tape recorder using an endless tape to select the message recorded on the endless tape not shown in this figure. The tape recorder constitutes a voice output unit 47 of a voice output controller 46.

The detailed circuit configuration of the voice selector 45 is shown in FIG. 5.

In FIG. 5, when the signal $S_L$ (in pulse form) is inputted into a one-shot multivibrator 51, the multivibrator 51 outputs a high level signal having a width T into a first switch circuit 52. The first switch circuit 52 turns on only for a predetermined time interval T. The driving motor 54 is then activated with the power supplied from a battery 53. When the driving motor 54 starts rotation, a synchronized cam 54a rotates to turn on a microswitch 55 connected in parallel with the first switch circuit 52. Therefore, the driving motor 54 continues rotation after the switch circuit 52 is turned off for a predetermined time interval T. When the cam 54a has made one rotation, the microswitch 55 turns off because an actuator of the microswitch 55 enters the concave portion of the cam 54a so that the driving motor 54 stops. Hence, during the operation of the driving motor 54 the trip distance information such as "0.5 km," "1 km," . . . , "100 km" as described above sequentially recorded in voice form can selectively be outputted according to the number of the signal $S_L$ outputted from the counter 42 each time the vehicle has traveled 0.5 km.

In addition, there are provided a second and third switch circuit 56 and 57 connected in series with each other and in parallel with the first switch circuit 52. The second switch circuit 56 is turned off when the Q output signal $S_Q$ is at the high level of the flip-flop 44 and turned on when the signal $S_Q$ is low. The third switch circuit 57 is turned off only when a start position of the endless tape (i.e., the position before the section on which "0.5 km" in the forementioned example is recorded) is passed through a playback head. In order to give an on-and-off control to the third switch circuit 57, a conductive foil M is adhered to the start position of the endless tape and a contact 58 is provided in the tape recorder which closes when the conductive foil M comes in contact with the contact 58. Since the contact 58 is open when the start portion of the endless tape is not under the playback head, the gate portion of the third switch circuit 58 goes low via a resistor $R_4$ so that the third switch circuit 58 turns on. When the start position of the endless tape is under the playback head, the contact 58 is closed and the gate portion of the third switch circuit is set high by the divided value of resistors $R_3$ and $R_4$ of the bias supply $+V$.

Therefore, when the production of consecutive messages ends at an intermediate section of the endless tape, the Q output signal $S_Q$ of the slip-flop 44 shown in FIG. 4 goes low and the second switch circuit 56 turns on, so that the driving motor 54 still continues rotating with its power supplied from the battery 53 via the second and third switch circuits 56 and 57. Since the third switch circuit 57 turns off when the start portion of the endless tape passes under the playback head again, the driving motor 54 stops with the microswitch 55 turned off, and the output selector 45 returns to the stand-by state of outputting a minimum unit of trip distance information such as 0.5 km.

In FIG. 4, the voice output unit 47 of the voice output controller 46 outputs message selected by the voice selector 45, i.e., a voice signal $V_S$ reproduced by the playback head via a gate circuit 48 (an AND gate). The voice signal $V_S$ is derived from message recorded on a section of the endless tape at a playback position.

At this time, if the Q output signal $S_Q$ of the flip-flop 44 and the voltage level of a point a connected via a pull-up resistor $R_2$ to a bias supply $+V$ are at a high level, the voice signal $V_S$ is outputted from the gate circuit 48. The voice signal $V_S$ is amplified by the amplifier 10 and produced by, e.g., a speaker of a car radio mounted in the automotive vehicle. The voice output controller 46 comprises the voice output unit 47, the gate circuit 48, the amplifier 50, and speaker not shown in FIG. 4.

When the switch 49 shown in FIG. 4 is depressed, the voltage level of the point a, one of the inputs of the gate circuit 48, goes low and the gate circuit 48 is closed to disable the signal $V_S$ from the voice output unit 47. The halt switch 48 is convenient when it is not necessary to know the trip distance information until some particular desired distance.

In the above-described example, the vehicle speed pulse signal $S_P$ is directly inputted to the counter 42 which outputs the output signal $S_L$ when the counted number exceeds its full scale value and is reset to the initial state. As an alternative, the vehicle speed signal $S_P$ is divided by a divider and the divided signal may be counted by a counter which is capable of counting up to the number corresponding to, e.g., 100 km while outputting the signal $S_L$ whenever the count exceeds a value which corresponds to, e.g., 0.5 km. Furthermore, the count value of the counter in the tape described above may be fed directly into the voice selector 45. In this case, the voice selector 45 is provided with a decoder which decodes a trip distance for every 0.5 km and activates a one-shot multivibrator 51 shown in FIG. 5.

Similarly, in the above described example, the trip distance information is indicated every time the vehicle has traveled a distance of 0.5 km. However, the distance interval may be changed, e.g., according to the vehicle speed. Furthermore, in the above described example, the output signal $S_L$ of the counter 42 is fed into the voice selector 45 together with the Q output signal $S_Q$ of the flip-flop 44. However, as shown in FIG. 1, the signal $S_L$ is counted again by the second counter 6 to feed into the interface 1 as a trip distance signal $S_C$ and the signal $S_Q$ is also fed into the interface 1 as a trip switch on or off signal $S_T$. In this way, the trip distance information signals form input signals to the interface 1 of the preferred embodiment described first.

Figure 6A:
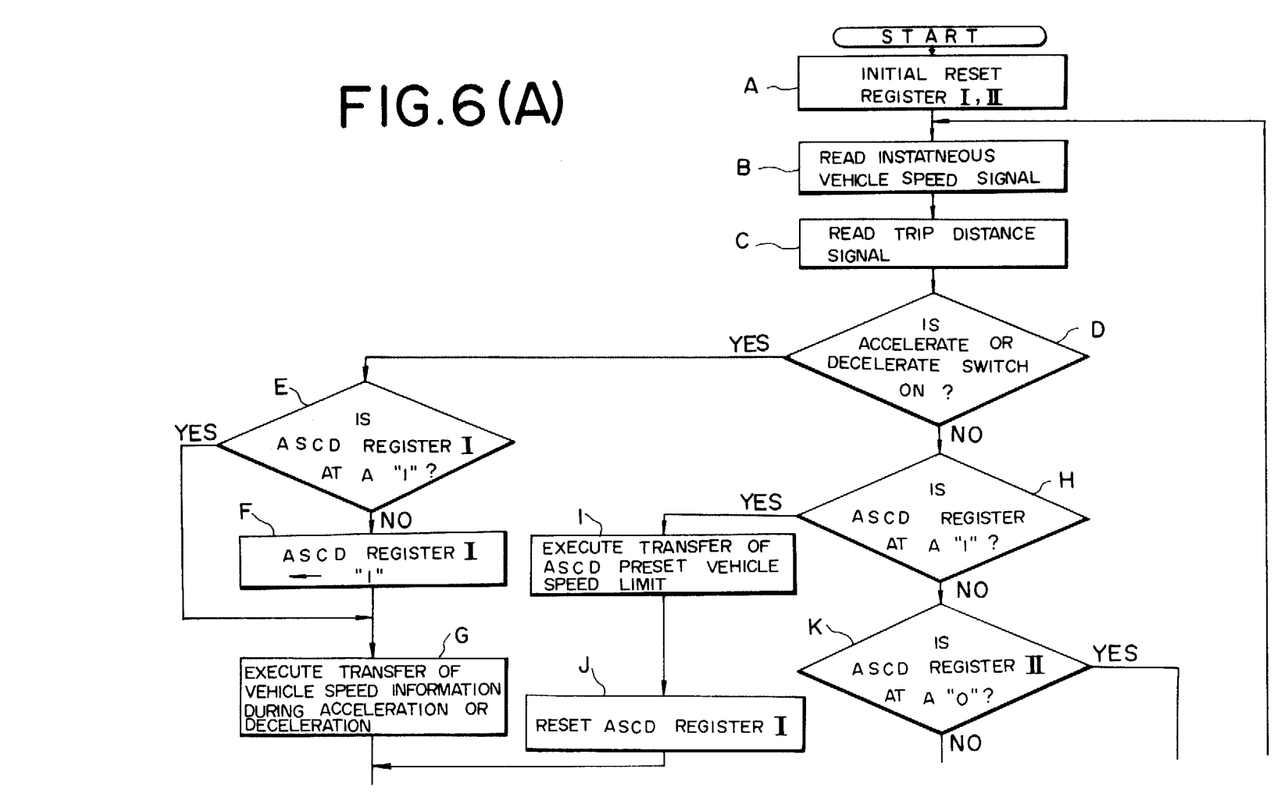
FIGS. 6 through 8 show flowcharts of a program stored in a control unit shown in FIG. 1 on a basis of which the microcomputer executes a processing routine for the items of vehicle speed warning information.
Figure 6B:
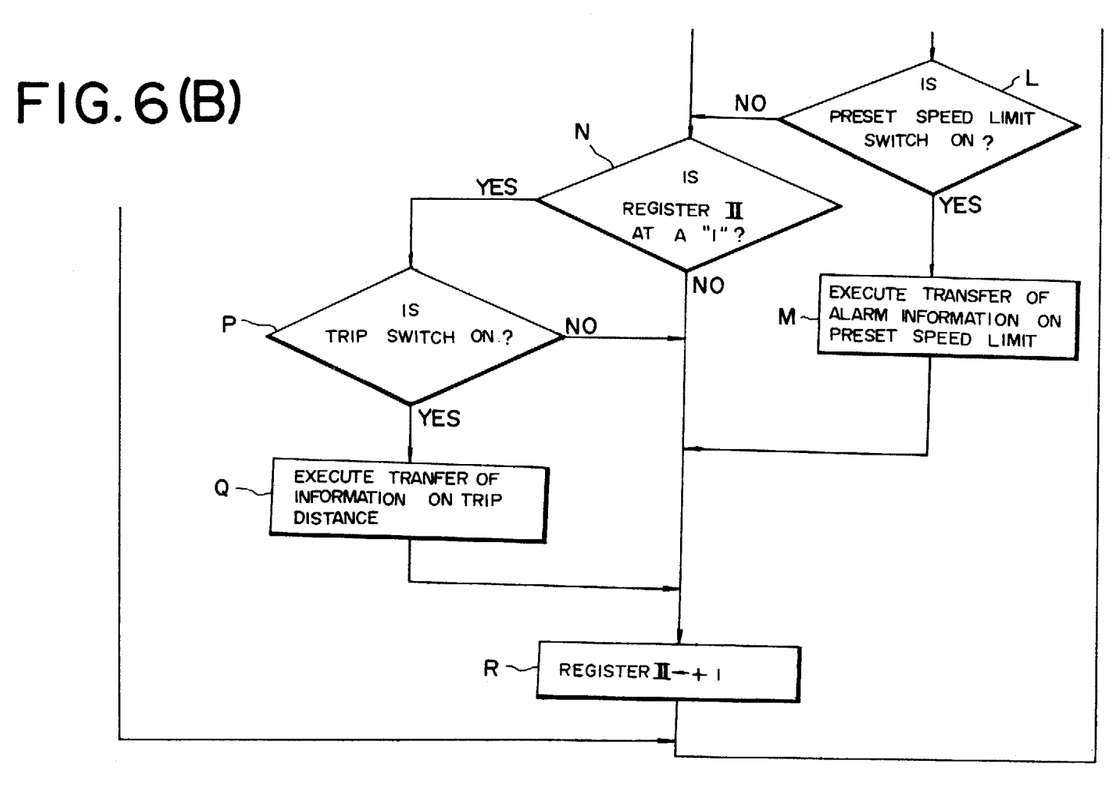
Figure 7:
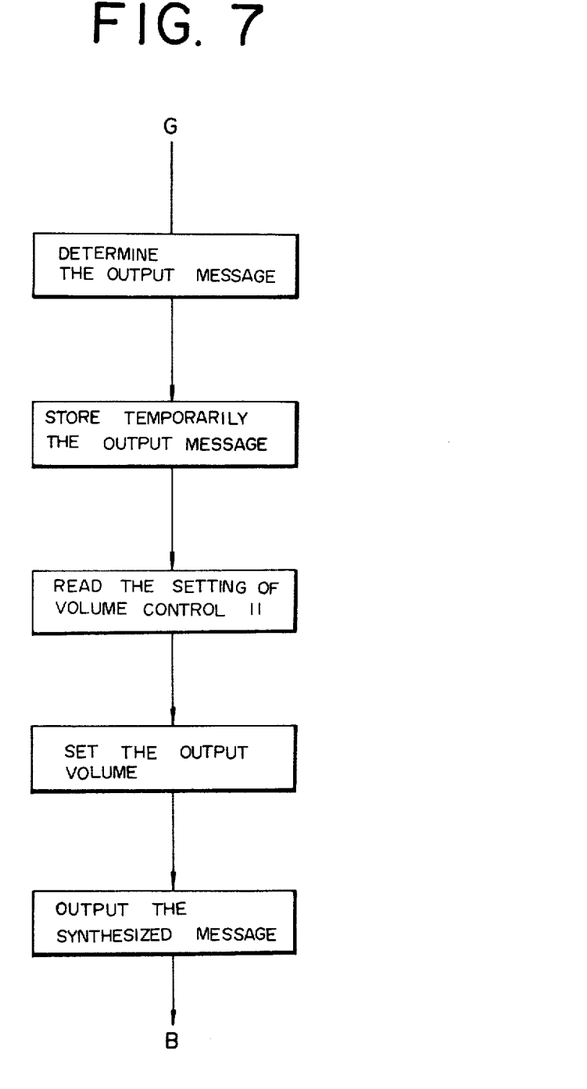
Figure 8:
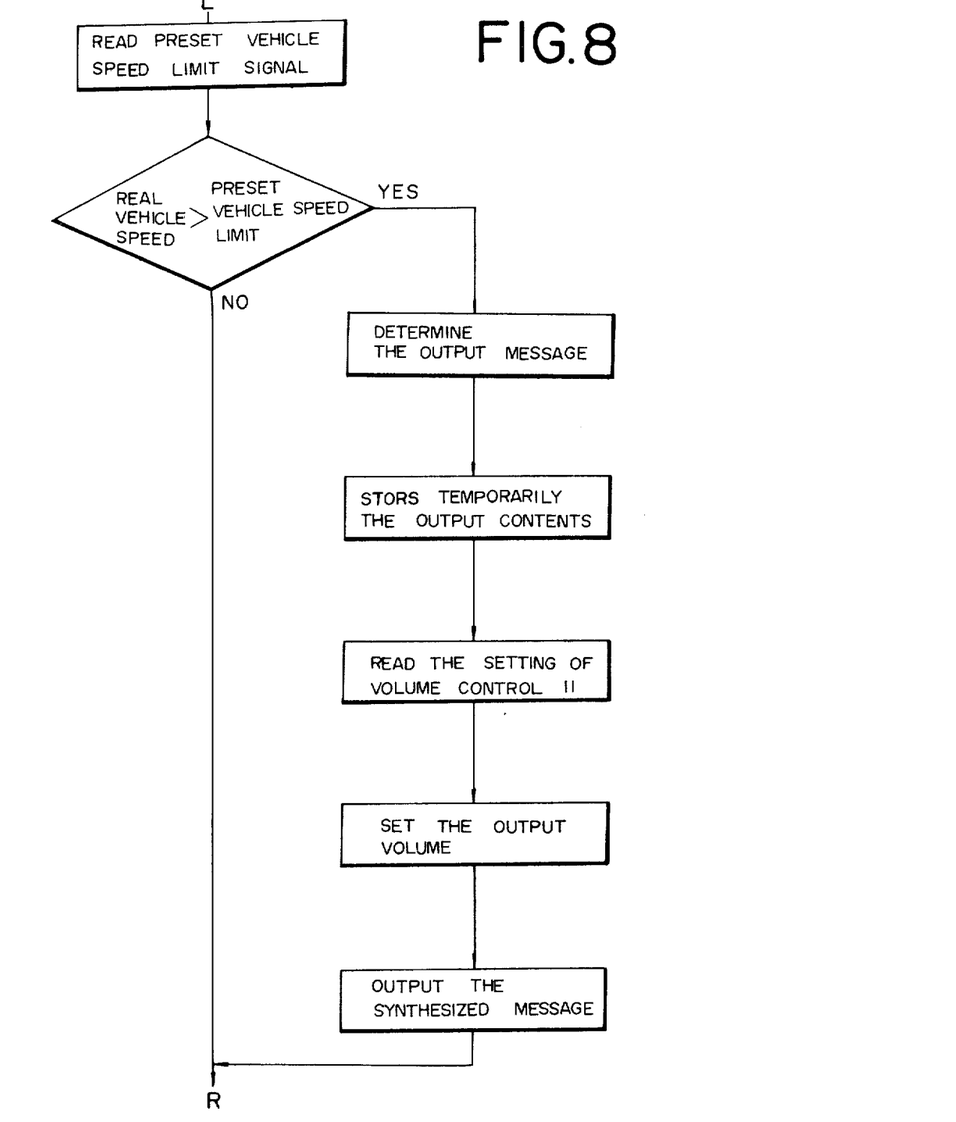

With reference to FIGS. 6 through 8, one example of the program the microcomputer is to execute is described below.

In FIG. 6, one-bit registers I and II in the microcomputer are initialized in step A. In steps B and C the instantaneous vehicle speed signal $S_K$ and trip distance signal $S_C$ are read into the microcomputer via a multiplexer in the interface 1. In step D the microcomputer checks to see if the ASCD accelerate or decelerate switch is turned on (depending on the level of signal $S_A$). If the signal $S_A$ is turned on, the microcomputer goes to step E. In step E the microcomputer checks to see if the value of ASCD register I is 1, if the register is not 1, the microcomputer sets the register to 1 in step F.

In step G, the microcomputer carries out the processing of vehicle speed information conveyance under acceleration or deceleration by means of ASCD.

As shown in FIG. 7, the processing is such that the microcomputer selects an output message such as "50 km/h" if the instantaneous vehicle speed signal $S_K$ read step B corresponds to a vehicle speed of 50 km/h and stores the output value temporarily in the RAM in the microcomputer.

The setting of the volume control 11 in the car radio 14 is checked by the volume control signal $S_{VR}$ by which the microcomputer determines the output volume to control the output volume of the electronic volume control 26. According to the value temporarily stored in the RAM of the microcomputer, the voice synthesized signal $V_S$ containing the above-described information is produced by controlling the memory 15 and voice synthesizer unit 18 to inform the driver of the vehicle speed during the acceleration or deceleration via the electronic volume control 26, the amplifier 27, and speaker 13. Upon completion of execution of step G, the microcomputer returns to step B shown in FIG. 6 to repeat the processing of the steps described above while the accelerate or decelerate switch is turned on. In this step, the vehicle speed during acceleration or deceleration is indicated to the driver in voice form for each change in the vehicle speed of, e.g., 5 km/h. In this case, since the ASCD register I is set to 1, the microcomputer skips the step F.

When the vehicle speed reaches a desired running speed and the driver turns the accelerate or decelerate switch off, the microcomputer advances from step D to step H.

In this step, the microcomputer checks to see if the value of ASCD register I is 1. If the register is 1 (when the accelerate or decelerate switch is switched from on to off, the register is always set to 1), in step I the microcomputer indicates the ASCD preset vehicle speed to the driver. The steps executed are that a program similar to that shown in FIG. 7 is executed and a synthesized message such as "The speed is set to seventy kilometers per hour" is produced through the speaker 13 according to a preset vehicle speed the instantaneous vehicle speed obtained in step A). When the preset vehicle speed is obtained, the microcomputer may read vehicle speed data stored in the memory used for controlling the ASCD instead of reading the signal $S_K$ counted by the counter 3 shown in FIG. 1 so that the preset vehicle speed can be indicated to the driver more accurately.

Upon completion of step I, ASCD register I is reset to 0 in step J. Then, returning to step B, the microcomputer reads an instantaneous vehicle speed signal $S_K$ and trip distance signal $S_C$ in steps B and C. Then, the processing routine advances to step K via steps D and H. In this case, if the accelerate or decelerate switch is not turned on, the processing routine advances directly to step H after reading signals $S_K$ and $S_C$. In step K, the microcomputer checks to see if the register II in the microcomputer is set to 0. As already described, since in this program the registers I and II are first initially reset, the register II is set to 0 in step K, and thus the routine goes to step L, where the microcomputer checks to see whether preset speed limit switch is turned on or not. If this switch is turned on, the routine goes to step M where preset speed limit warning is carried out. If the preset speed limit switch is turned off, the routine proceeds to step N where the microcomputer checks to see if register II is set to 1. If the register II is set to 1, the routine goes to step P.

As shown in FIG. 8, the preset speed limit warning is indicated to the driver in step M.

The preset speed limit signal $S_V$ is read into the microcomputer by controlling the multiplexer of the interface 1, after an instantaneous vehicle speed signal $S_K$ (actual vehicle speed) read at step A shown in FIG. 6 is compared with the preset speed signal $S_V$, and the microcomputer executes a program similar to that shown in FIG. 7. The output message is determined according to the degree of excess over the preset speed limit; e.g., a synthesized message such as "ten kilometers per hour over preset limit". If the actual vehicle speed is below the predetermined vehicle speed, the processing for outputting the message described above is not performed.

Upon completion of information given to the driver of the preset speed limit warning, the routine goes to step R shown in FIG. 6. In this step, the one bit register II is incremented by one so that it changes state from 0 to 1 or vice versa. Therefore, since register II is 0, it is changed to 1 in this step. In step P if the trip switch is not turned on, the routine goes to step R where the register II is incremented to be set to 0 then and returns to step B. On the other hand, if the trip switch is turned on, the routine goes to step Q where the trip distance information is given to the driver. The processing is such that the microcomputer executes a program similar to that shown in FIG. 7, i.e., determines the message according to the trip distance signal $S_C$ read at step C (an information showing the trip distance from the time when the trip switch is turned on). Upon completion of step R, the instantaneous vehicle speed signal $S_K$ and trip distance signal $S_C$ are read in step B. If the accelerate or decelerate switch of the ASCD is not turned on, the routine goes to step K via step H. In this routine, since register II is set to 1, the microcomputer does not proceed to step L but goes to step N and then step P. In step P, the microcomputer checks whether the trip switch is on, and outputs a message such as "Trip distance is five kilometers" if the trip distance signal indicates a value corresponding to 5 km. Upon completion of step Q, the microcomputer returns to step B via step R shown in FIG. 6.

If both the ASCD accelerate and decelerate switches and preset speed limit switch are turned off, the distance traveled is indicated as a synthesized message each time the vehicle has traveled a predetermined distance, e.g., 0.5 km.

If the ASCD accelerate or decelerate switch is turned off but the preset speed limit switch is turned on, the microcomputer executes the processing of information for the preset speed limit warning to the driver when the contents of register II is 0 and thereafter executes the processing of information for the trip distance to be given to the driver when register II is set to 1. Of course, during the execution of such procedures the microcomputer executes only items of information on ASCD in top priority if the ASCD accelerate or decelerate switch is turned on.

Since the interval from the time when the ASCD accelerate or decelerate switch is turned on until the time the vehicle ASCD speed is preset is short, there is no problem of overlapping information given to the driver during this interval. It will be understood by those skilled in the art that modifications may be made in the preferred embodiment described above without departing from the spirit and scope of the present invention, which is to be defined by the appended claims.

What is claimed is:

1. A voice warning system for an automotive vehicle wherein an automatic vehicle speed control device is incoporated for increasing or decreasing the vehicle speed to a speed desired by the driver while an accelerate or decelerate switch in the automatic vehicle speed control device is turned on and for maintaining automatically the desired speed set when the accelerate or decelerate switch is turned off, which comprises:

(a) a first detector for detecting an instantaneous vehicle speed from vehicle speed pulses of a vehicle speed sensor;

(b) a signal generator for generating a signal corresponding to speed limit preset by the vehicle driver;

(c) a second detector for detecting a trip distance the automotive vehicle has traveled whenever a predetermined interval of distance is reached after a trip switch is turned on;

(d) a voice selector connected to said first and second detectors and signal generator for selectively outputting a voice signal first according to the output signal from said first detector when the accelerate or decelerate switch is turned on and a signal representing a driver desired vehicle speed set when the accelerate or decelerate switch is turned off, secondly according to the output signal from said signal generator and lastly according to the output signal from said second detector; and (e) a voice output controller connected to said voice selector for outputting a message at a suitable volume according to the voice signal from said voice selector, whereby automatic vehicle speed control information such as an instantaneous vehicle speed while the accelerate or decelerate switch is turned on and a driver desired speed set when the accelerate or decelerate switch is turned off, vehicle speed warning message obtained when the actual vehicle speed exceeds the preset speed limit, and a trip distance message detected by said second detector can be conveyed to the vehicle driver in the order of priority described above reliably and without confusion with one another.

2. A voice warning system for an automotive vehicle as set forth in claim 1, wherein said first detector comprises:

(f) a frequency-to-frequency converter connected to the vehicle speed sensor for converting a frequency of vehicle speed pulses from the vehicle speed sensor into a higher frequency of vehicle speed pulses; and (g) a counter connected to said frequency-to-frequency converter for counting the number of vehicle speed pulses fed from said frequency-to-frequency converter for a period of time predetermined by a timer circuit, whereby an output signal from said counter representing an accurate instantaneous vehicle speed can be read into said voice selector while the accelerate or decelerate switch is turned on and as a driver desired vehicle speed set when the accelerate or decelerate switch is turned off.

3. A voice warning system for an automotive vehicle as set forth in claim 1, wherein said signal generator comprises:

(h) speed limit preset lever with preset speed limit switch; and (i) a circuit connected to said speed limit preset lever for outputting a voltage signal proportional to a speed preset with said speed limit preset lever when said speed limit switch is turned on, whereby the voltage signal outputted from said output circuit can be read into said voice selector.

4. A voice warning system for an automotive vehicle as set forth in claim 1, wherein said second detector comprises:

(j) a divider connected to the vehicle speed sensor for dividing a frequency of vehicle speed pulses fed from the vehicle speed sensor;

(k) a first counter connected to said divider for counting the number of vehicle speed pulses divided by said divider and for outputting an overflow signal and being reset initially whenever counting up to a full scale value corresponding to a predetermined interval distance; and (l) a second counter connected to said first counter for counting the overflow signal fed from said second counter and for outputting a signal representing a trip distance the automotive vehicle has traveled, whereby an output signal from said second counter representing a trip distance can be read into said voice selector.

5. A voice warning system for an automotive vehicle as set forth in any of claims 1 through 4, wherein said second detector further comprises:

(m) a halt switch for disabling any of output signals from said first and second detectors and signal generator to be read into said voice selector, whereby said voice selector does not produce a voice signal for the corresponding output signal.

6. A voice warning system for an automotive vehicle as set forth in claim 1, wherein said voice selector comprises:

(n) a voice warning control device for outputting a voice signal synthesized by a voice synthesizer unit first according to an output signal from said first detector for a predetermined interval of change in the vehicle speed while the accelerate or decelerate switch is turned on and according to a driver desired vehicle speed indicating signal set when the accelerate or decelerate switch is turned off and thereafter according to the difference detected by comparing an actual vehicle speed obtained from said first detector with speed limit preset with said signal generator to detect whether the actual vehicle speed exceeds the preset speed limit and lastly according to an output signal from said third detector for a predetermined interval of trip distance; and (o) an interface connected between said first and second detectors and signal generator and said voice warning control device for interfacing said first and second detectors and signal generator with said voice warning control device.

7. A voice warning system for an automotive vehicle as set forth in claim 1 or 6, wherein the interval of trip distance predetermined by said first counter may be changed according to the actual speed of the automotive vehicle.

* * * * *